March 29, 1966     R. P. KELLER     3,242,729
ELECTROLYTIC FLOWMETER
Filed June 17, 1963
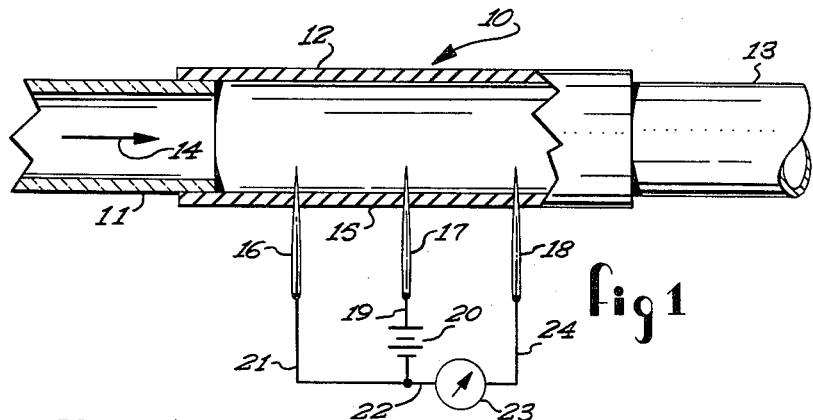
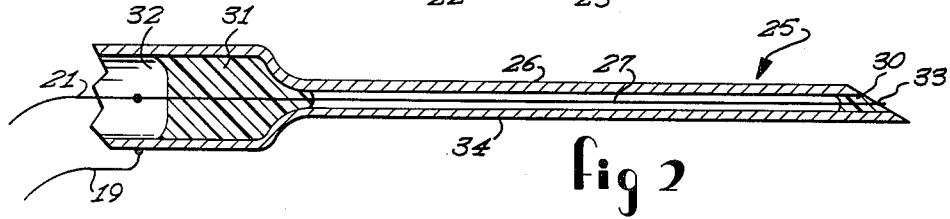
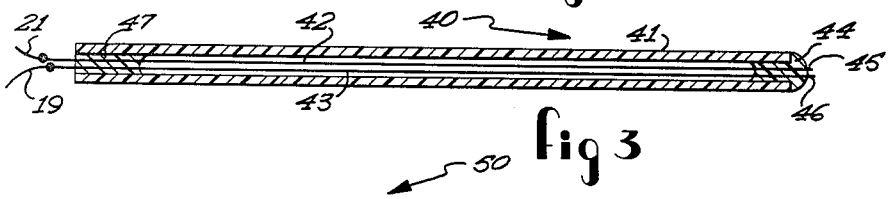
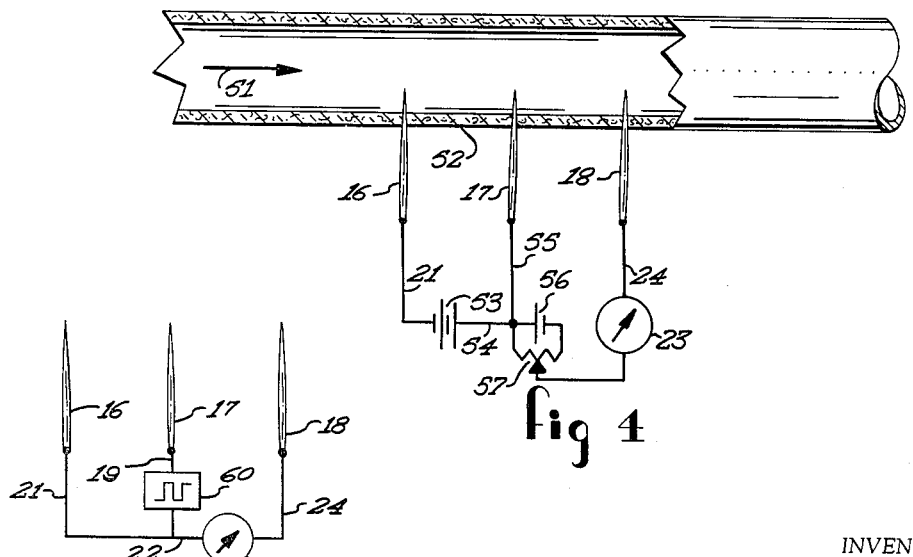
INVENTOR.
ROGER P. KELLER
BY Alfred N. Feldman
ATTORNEY United States Patent Office 3,242,729
Patented Mar. 29, 1966

3,242,729
ELECTROLYTIC FLOWMETER
Roger P. Keller, Bloomington, Minn., assignor to
Honeywell Inc., a corporation of Delaware
Filed June 17, 1963, Ser. No. 288,130
7 Claims. (Cl. 73—194)

The present invention is directed to a unique type of flowmeter, and more particularly is directed to a flowmeter that will measure accurately the rate of flow of any electrolytic fluid without any substantial disturbance being created in the flow channel and without altering the character of the flowing fluid.

Flowmeters of various types have been the subject of extensive design and development work. There are a large number of types of flowmeters that utilize the characteristics of the rate of flow itself or a characteristic of the fluid flowing as a means of measuring the rate of flow. In many systems it is not material whether the rate of flow is disturbed or whether the fluid flow channel is altered in some way to obtain a measure of the rate of fluid flow. In many other flow devices it is essential that the fluid flow circuit be undisturbed and that the vessel or circuit in which the fluid travels remains undisturbed for best results. The latter of these is the subject of the present invention. More particularly, the present flowmeter has great utility in measuring the rate of flow of an electrolyte such as blood without disturbing, to any appreciable extent, the blood vessel in which the flow exists. This type of flowmeter is essential in current day medicine in order to monitor the condition of a patient undergoing some form of treatment and it is very desirable that as little disturbance be created as possible, but yet an accurate measure of the rate of flow of the blood is essential.

In the present invention, a flowmeter is disclosed that approaches the ideal. The present flowmeter disturbs the fluid flow circuit to an almost minimum degree and utilizes the characteristics of the flowing fluid as a means of measuring the rate of flow. The characteristics of the fluid remain substantially unchanged and the accuracy of the device is exceptionally good.

It is a primary object of the present invention to disclose a flowmeter that can accurately measure the rate of flow of any electrolyte by using the free ions in the electrolyte.

Another object of the present invention is to disclose a flowmeter that uses a very low potential to polarize an electrode exposed to a flowing electrolyte and to measure the degree of polarization through a separate high impedance measuring circuit.

Yet another object of the preseent invention is to disclose a flowmeter that utilizes the rate of removal of ions from a polarized electrode as an indication of rate of flow of the fluid containing the ions.

Still another object of the present invention is to disclose a blood flowmeter where the rate of flow can be measured accurately in a blood vessel without substantial damage to the vessel or to the blood.

These and other objects will become apparent when a full consideration of the present invention is undertaken with the drawings, wherein:

FIGURE 1 is a schematic representation of a fluid flow system utilizing a three-electrode flowmeter of the present invention, in its simplest form;

FIGURE 2 is a cross section of a hypodermic needle which forms two of the three electrodes necessary to operate the flowmeter of the present invention;

FIGURE 3 is a cross section of a catheter incorporating two electrodes of the three utilized in the present invention;

FIGURE 4 is a cross section of a blood vessel containing flowing blood and discloses a three-electrode flowmeter having a bucking voltage to facilitate readout, and;

FIGURE 5 is a schematic representation of an alternate method of energizing the three electrodes of the invention of the present application.

In FIGURE 1 a fluid flow circuit is generally shown at 10. This circuit includes a glalss tube 11 connected by a rubber tube 12 to a second glass tube 13. Flowing in the circuit 10 is an electrolyte 14 indicated by an arrow. The electrolyte 14 substantially fills the circuit 10. The term electrolyte is used in its broadest sense to indicate a fluid containing ions that are dissociated or are free in the fluid. Typical electrolytes are fluids such as blood, water with a small amount of sodium chloride, and many other types of fluids wherein positive and negative ions are freely available without the application of any external electrical potential. Many of the experiments conducted on the present flowmeter were conducted with blood, as well as, with a 0.9 percent sodium chloride solution which simulates blood.

The electrolyte flow 14 passes from glass tube 11 into the rubber tube 12 and out of the glass tube 13. Inserted in a bottom 15 of the tube 12 are three electrodes 16, 17, and 18. The electrodes 16, 17, and 18 are in the form of needles and can be made of a material such as stainless steel to avoid any possible interaction of a chemical nature between the electrodes and the electrolyte 14. Any other convenient electrically conductive material can be used for the electrodes and the recitation of stainless steel in no way forms a limitation.

It will be noted that the electrodes 16, 17, and 18 penetrate the bottom 15 and project into contact with the elecrolye 14. The projection of the electrodes 16, 17, and 18 is insufficient in volume to upset to any substantial degree the flow, either in volume or in its normal flow pattern.

Connected to electrode 17 by conductor 19 is a battery 20 of a very low potential. The battery 20 in certain test configurations has been 1.5 volts. Any low potential direct current source having a relatively low internal impedance can be utilized. Connected to battery 20 is a conductor 21 that is connected electrically to electrode 16. To the junction of the conductor 21 and the battery 20, there is connected a second conductor 22 that joins to a high impedance current measuring means 23, which is in turn connected by conductor 24 to electrode 18 to complete the external electrical circuit.

The high impedance current measuring means 23 has been shown schematically as a meter but can be any type of high impedance measuring device such as an oscilloscope, vacuum tube voltmeter, or similar type of device, well known in the electrical arts. The main feature of the curent measuring means 23 is that a minimum amount of electric current is drawn to obtain a variation in indication, this also being compatible with the fact that the means 23 has an excedingly high impedance, the reason for which will become apparent as the method of operating the device is explained.

In operation, the electrolyte 14 flows in the fluid flow circuit 10 and provides a condition where free ions are available. It should be understood that the free ions are in a positively or negatively charged state and are free and dissociated. The total or net charge in the electrolyte is neutral due to the random distribution of the ions and the ions are relatively chemically inert. The ions available are not ions from a breakdown of the fluid itself, as would be true in electrolysis, but the normal free ions considered available in an electrolyte.

When the potential 20 is applied between the electrodes 16 and 17 the free ions tend to drift toward the electrodes as current carriers. They react at the electrode thus leaving a concentration gradient of oppositely charged ions in the vicinity of the electrode. The depletion of ions of a given charge, native ions at the positive electrode and positive ions at the negative electrode, is responsible for the phenomenon known as concentration polarization which is made evident electrically by a back E.M.F. or an added resistance in series with each polarized electrode. The term polarization is well known in the electrochemical arts. This process must be distinguished from the application of sufficient potential between electrodes 16 and 17 to break the fluid down chemically as would occur in electrolysis. The potential 20 is low enough so that substantially no electrolysis occurs but only a shifting of the free ions so that they polarize or collect around the electrodes 16 and 17. Since the free ions collect around the electrodes, they build up a sheath or coating that is the basis of polarization. This sheath forms an electrical resistive effect. The flow of fluid or electrolyte 14 past the tips of the electrodes 16 and 17 tends to remove the free ions on the outer portion of the sheath that collects around the electrodes 16 and 17. It thus becomes apparent that the faster the electrolyte 14 moves, the less the free ions can collect around the electrodes 16 and 17. As such, the electrodes 16 and 17 can be considered as being depolarized, and the rate or degree of polarization therefore varies inversely with the rate of flow of the electrolyte 14 if the potential 20 is kept constant.

The rate of removal of the ions from the electrodes 16 and 17 therefore is a measure of the rate of flow of the electrolyte. In order to take advantage of this phenomenon, the second or measuring circuit has been added to the device between electrodes 17 and 18. Since the electrolyte 14, by its definition as an electrolyte, will conduct current, and since a voltage appears between electrodes 17 and 18 because of the polarized condition and there are high resistances of the diffusion layer around electrodes 17, a current will tend to flow between electrodes 16 and 18. Ordinarily electrode 18 would tend to build up polarizing layers also but due to the fact that an exceedingly high impedance current measuring means 23 is interpassed, the amount of potential or current flow available is slight enough so that the polarization of electrode 18 is negligible. Since the layer of ions covering electrode 17 varies inversely as the rate of flow, the current indicated by the high impedance current measuring means 23 will also vary. The resistance between electrodes 17 and 18 is a function of the degree of polarization as the sheath of ions formed around the exposed part of electrode 17. It thus becomes apparent that as the sheath of ions about electrodes 16 and 17 becomes greater, the resistance of the circuit between electrodes 16 and 17 becomes greater and the current indicated by the measuring means 23 changes. As the rate of flow of the electrolyte 14 increases and the ions are swept away from electrodes 16 and 17 the resistance in this circuit drops. This decrease in resistance through the electrolyte changes the indication on the current measuring means 23. It then becomes apparent that the degree of polarization varies inversely with the fluid flow rate past the electrode means, and that the current being indicated on the current indicating means 23 varies as a function of the degree of polarization. With this knowledge, the indication on the current measuring means 23 becomes a direct indication of rate of flow of the electrolyte 14. Once again it is necessary to emphasize the fact that the voltage 20 is kept sufficiently low to avoid electrolysis and the impedance of the current measuring means 23 is kept high enough so that there is little or no polarization of electrode 18 to interfere with the measuring circuit.

In FIGURE 2, a second structure of electrodes is disclosed. Two of the electrodes are in the form of a hypodermic needle. The hypodermic needle 25 has an outer stainless steel wall 26 and an inner insulated stainless steel wire 27. The wire 27 is separated from the wall 26 by a plastic insert 30 at the tip end of the needle 25, while a plastic insert 31 is used to support the electrode wire 27 at the broad end 32 of the needle 25. In actual experimental work, the needle 25 was manufactured out of a 20-gauge stainless steel hypodermic needle and an insulated stainless steel wire 27 was used as the center electrode. The center electrode 27 is exposed electrically at 33 and is electrically isolated by the plastic 30 from the tip 34 of the hypodermic needle 25. The hypodermic needle 25 can be inserted in a blood vessel and replaces electrodes 16 and 17 of FIGURE 1. As such, conductor 21 is shown connected to the electrode 27 while the conductor 19 is provided which is connected to the battery 20. The third electrode used with the hypodermic needle 25 is in the form of a stainless steel needle 18 and would be hooked to the system by inserting the needle 18 in the fluid flow circuit at any convenient location. In general, it is desirable that the electrodes 16 and 17 of FIGURE 1 be kept in close proximity to one another while the position of the electrode 18 with relationship to the electrodes 16 and 17 is relatively unimportant. As such, the hypodermic needle 25 of FIGURE 2 can be inserted in a blood vessel at any desired location while the electrode 18 that completes the circuit can be inserted separately at a location in the general proximity of the hypodermic needle 25 to complete the electrical circuit.

In FIGURE 3 a catheter tube 40 is disclosed. The catheter tube is a mechanical implement formed of a plastic tube 41 and in the present case has a pair of stainless steel conductors or wires 42 and 43 that are insulated from one another and which are sealed by a plastic 44 into the tip of the catheter tube 41. The wires 42 and 43 are exposed at 45 and 46 to form the electrode means. The opposite ends of conductors 42 and 43 are mounted in plastic 47 and are connected by lead 21 to the battery of FIGURE 1 while the other lead 19 is connected to the battery 20 as would be the electrode 17 of FIGURE 1. The catheter can be inserted in any recess in a body so that the tip 44 approaches a point at which the rate of flow of blood is to be measured. Once again, a separate electrode means of the type disclosed in FIGURE 1 at 18 is utilized for the third electrode in the system.

In FIGURE 4 a blood vessel 50 is disclosed having a blood flow 51. Inserted through the bottom 52 of the blood vessel 50 are the three electrodes 16, 17, and 18. In this particular application a low potential direct current source 53 is connected by conductors 54 and 55, and conductor 21 between the electrodes 16 and 17. The conductor 55 connects to a potentiometer circuit of a source 56 and potentiometer 57, with the current measuring device 23 and conductor 24. In this particular figure, the voltage sources 56 and 53 are connected in opposition in the manner shown. The battery 53 provides the voltage necessary to polarize the electrodes 16 and 17, while the battery 56 and potentiometer 57 provides a potential necessary for the resistance measurement between electrodes 17 and 18. The second battery 56 in the potentiometer circuit merely provides a D.C. component to the flow signal so that it may be more easily kept on scale of the measuring means 23. It does not affect the function of the device as a whole. In the arrangement disclosed, the battery 53 is connected so that electrode 17 has a potential or attraction to the ions flowing in the blood 51. The operation of the circuit is substantially the same as that described in connection with FIGURE 1.

In FIGURE 5, there is disclosed an alternate circuit that can be connected in FIGURE 1 for the application of the direct current potential. Conductor 21 is shown along with conductor 22 applied to the current measuring means 23 which in turn is connected to conductor 24. Replacing the battery 20 is square wave generating means 60. In effect, the square wave generating means 60 supplies a very low voltage direct current for a short period of time and then returns to an "off" condition. This type of square wave generator is well known in the electrical arts. In reality, this same type of square wave generator could be accomplished by alternately turning "on" and "off" a switch and short circuit around the battery 20 of FIGURE 1. It is enough to indicate that the voltage is always applied in the same direction and is applied for a short period of time.

The operation of the device in FIGURE 5 provides for a short polarizing period to collect the ions at the electrodes 16, 17, with the measuring circuit between electrodes 17 and 18. The measuring circuit is applied during the polarizing time or when the square wave is at its peak. The square wave voltage is then turned "off" and without a voltage applied to the electrodes 16 and 17 the sheath of ions collecting is dispersed and carried away by the fluid flow in the circuit. This periodically clears the ions and completely depolarizes the electrodes. This gives a measuring device that is completely free of any residual polarization of the electrodes 16 and 17.

While the present invention has been disclosed in a few of its possible embodiments, the application of three electrodes and a low voltage polarization circuit along with a high impedance secondary measuring circuit could be built up in many configurations. Since the configurations and application of the present idea can be applied to any type of electrolyte and in any type of flow situation, the applicant believes that one skilled in the art could readily vary the structure from that specifically disclosed in FIGURES 1 to 5 without departing from the scope of the present invention. As such, the applicant wishes to be limited in the scope of the present invention only by the scope of the appended claims.

I claim as my invention:

1. In a system for measuring the rate of flow of an electrolyte: a fluid flow circuit including an electrolyte having a rate of flow which is to be measured; three electrode means exposed to said electrolyte; low voltage source means connected between a first and a second of said electrode means to cause at least one of said electrode means to become polarized; and high impedance current measuring means connected to said third electrode means and said voltage source means to pass a current between said third electrode means and said polarized electrode means; said degree of polarization varying inversely with said fluid flow rate past said electrode means and said current being a function of said degree of polarization.

2. In a system for measuring the rate of flow of an electrolyte having free ions: a fluid flow circuit including an electrolyte having a rate of flow which is to be measured; three electrodes exposed to said electrolyte in said circuit; a direct current, low voltage source means connected between a first and a second of said electrodes to cause at least one of said electrodes to become polarized by ions collecting at said polarized electrode; and high impedance current measuring means connected to said third electrode and said voltage source means to pass a direct current between said third electrode and said polarized electrode through said electrolyte; said degree of polarization varying inversely with said fluid flow rate past said polarized electrode by said electrolyte carrying away some of said free ions, and said current varying as a function of said degree of polarization.

3. In a system for measuring the rate of flow of an electrolyte having free ions: a fluid flow circuit including an electrolyte having a rate of flow which is to be measured; three electrodes exposed to said electrolyte in said circuit; a periodically pulsed direct current, low voltage source means connected between a first and a second of said electrodes to cause at least one of said electrodes to become polarized by ions collecting at said polarized electrode; and high impedance current measuring means connected to said third electrode and said voltage source means to pass a pulsed direct current between said third electrode and said polarized electrode through said electrolyte; said degree of polarization varying inversely with said fluid flow rate past said polarized electrode by said electrolyte carrying away some of said free ions, and said current periodically varying as a function of said degree of polarization.

4. In a system for measuring the rate of flow of an electrolyte having free ions: a fluid flow circuit including an electrolyte having a rate of flow which is to be measured; three electrode means exposed to said electrolyte; low voltage source means connected between a first and a second of said electrode means to cause both of said electrode means to become polarized by said ions collecting at said electrode means; and high impedance current measuring means connected to said third electrode means and said voltage source means to pass a current between said third electrode means and one of said polarized electrode means through said electrolyte; said degree of polarization varying inversely with said fluid flow rate past said polarized electrode means by said electrolyte carrying away some of said free ions, and said current being a function of said degree of polarization remaining.

5. In a system for measuring the rate of flow of an electrolyte having free ions; a fluid flow circuit including an electrolyte having a rate of flow which is to be measured; three electrode means exposed to said electrolyte; first low voltage source means connected between a first and a second of said electrode means to cause said electrode means to become polarized by said ions collecting at said electrode means; and high impedance current measuring means connected to said third electrode means and second low voltage source means to pass a current between said third electrode means and said polarized electrode means through said electrolyte; said degree of polarization varying inversely with said fluid flow rate past said polarized electrode means by said electrolyte carrying away some of said free ions; said current in said measuring means being a function of said degree of polarization.

6. In a system for measuring the rate of flow of blood: a fluid flow circuit including blood having a rate of flow which is to be measured; a hypodermic needle electrode enclosing an insulated central electrode exposed to said blood; low voltage source means connected between said needle and said central electrode to cause said electrodes to become polarized; and high impedance current measuring means connected to a third electrode exposed to said blood and said voltage source means to pass a current between said third electrode and at least one of said polarized electrodes; said degree of polarization varying inversely with said blood flow rate past said polarized electrodes and said current being a function of said degree of polarization.

7. In a system for measuring the rate of flow of blood: a fluid flow circuit including blood having a rate of flow which is to be measured; a catheter having two enclosed insulated electrodes exposed to said blood; low voltage source means connected between said electrodes to cause said electrodes to become polarized; and high impedance current measuring means connected to a third electrode exposed to said blood and said voltage source means to pass a current between said third electrode and at least one of said polarized electrodes; said degree of polarization varying inversely with said blood flow rate past said polarized electrodes and said current being a function of said degree of polarization.

References Cited by the Examiner

UNITED STATES PATENTS 1,441,796  4/1922  Meyer _____ 73—194
2,773,236  12/1956  Martin et al. _____ 324—30 X

OTHER REFERENCES

"Detention and Direct Recording of Left to Right Shunts with the Hydrogen Electrode Catheter" by Clark et al., from Surgery, St. Louis, volume 46, No. 4, pp. 797–804; October 1959.

RICHARD C. QUEISSER, *Primary Examiner.*

E. D. GILHOOLY, *Assistant Examiner.*